(12) United States Patent
Jeong et al.

(10) Patent No.: US 11,373,329 B2
(45) Date of Patent: Jun. 28, 2022

(54) METHOD OF GENERATING 3-DIMENSIONAL MODEL DATA

(71) Applicant: NAVER LABS CORPORATION, Seongnam-si (KR)

(72) Inventors: Yeong Ho Jeong, Seongnam-si (KR); Dong Cheol Hur, Seongnam-si (KR); Sang Wook Kim, Seongnam-si (KR)

(73) Assignee: NAVER LABS CORPORATION, Seongnam-si (KR)

( * ) Notice: Subject to any disclaimer, the term of this patent is extended or adjusted under 35 U.S.C. 154(b) by 42 days.

(21) Appl. No.: 17/095,082

(22) Filed: Nov. 11, 2020

(65) Prior Publication Data
US 2021/0142511 A1 May 13, 2021

(30) Foreign Application Priority Data
Nov. 12, 2019 (KR) .................. 10-2019-0144540

(51) Int. Cl.
*G06T 7/73* (2017.01)
*G06T 7/50* (2017.01)
*G06F 17/16* (2006.01)

(52) U.S. Cl.
CPC ............ *G06T 7/73* (2017.01); *G06F 17/16* (2013.01); *G06T 7/50* (2017.01); *G06T 2200/04* (2013.01); *G06T 2200/08* (2013.01)

(58) Field of Classification Search
CPC ............ G06T 7/579; G06T 7/73; G06T 7/246
See application file for complete search history.

(56) References Cited

U.S. PATENT DOCUMENTS

| | | | |
|---|---|---|---|
| 2005/0031329 A1* | 2/2005 | Krumm | G06T 7/85 396/100 |
| 2005/0078178 A1* | 4/2005 | Brown | H04N 7/181 348/139 |
| 2013/0226532 A1* | 8/2013 | Ben Himane | G06T 7/75 703/1 |
| 2016/0260250 A1* | 9/2016 | Jovanovic | H04N 13/246 |
| 2017/0243318 A1* | 8/2017 | Aller | G06T 7/73 |
| 2017/0243359 A1* | 8/2017 | Bose | A63F 13/212 |
| 2018/0012411 A1* | 1/2018 | Richey | G06T 19/006 |
| 2018/0286065 A1* | 10/2018 | Knorr | G06T 7/277 |
| 2019/0108651 A1* | 4/2019 | Gu | G06V 10/955 |
| 2019/0147221 A1* | 5/2019 | Grabner | G06T 7/75 382/103 |

* cited by examiner

*Primary Examiner* — Phi Hoang
(74) *Attorney, Agent, or Firm* — Greer Burns & Crain Ltd.

(57) ABSTRACT

Provided is a method, performed by a computing device communicating with a server, of generating 3-dimensional (3D) mode data. The method includes: capturing, by a camera, an image of a target object at a first time point and storing first pose data of the camera at this time; generating a second image by capturing, by the camera, the target object at a second time point and generating second pose data of the camera at this time; calculating a distance between the camera at the second time point and the target object, based on the first pose data and second pose data of the camera; generating pose data of the target object, based on the distance and the second pose data of the camera; and estimating second relative pose data of the target object, based on the second pose data of the camera and the pose data of the target object.

19 Claims, 12 Drawing Sheets

FIG. 5
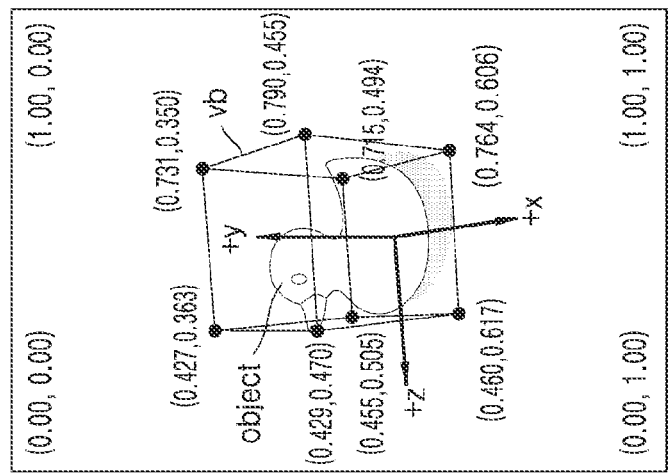
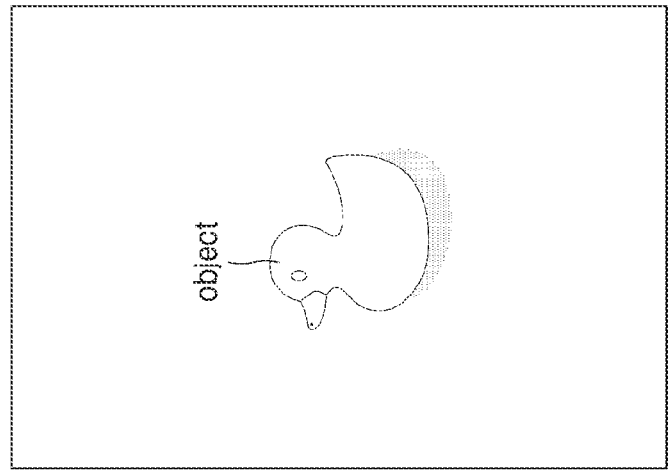

METHOD OF GENERATING 3-DIMENSIONAL MODEL DATA

CROSS-REFERENCE TO RELATED APPLICATION

This application is based on and claims priority under 35 U.S.C. § 119 to Korean Patent Application No. 10-2019-0144540, filed on Nov. 12, 2019, in the Korean Intellectual Property Office, the disclosure of which is incorporated by reference herein in its entirety.

BACKGROUND

1. Field

The present disclosure relates to a method of generating 3-dimensional (3D) model data, and more particularly, to a method of generating 3D model data capable of generating an image of a target object captured by a camera and relative pose information of the target object with respect to the camera.

2. Description of Related Art

This section provides background information related to the present disclosure which is not necessarily prior art.

Augmented reality is one field of virtual reality and is a computer graphic technique that synthesizes a virtual object into an actual environment such that the virtual object looks like an object present in an original environment.

Among technologies for implementing augmented reality, there is a technology of recognizing a target object, estimating a pose of the recognized target object, and generating a 3-dimensional (3D) image of a virtual object having a same pose as the pose of the target object to augment the 3D image on the target object. To augment the 3D image of the virtual object on the target object, not only it is required to accurately recognize the target object from a captured image, but also it is required to accurately calculate a relative pose of the target object with respect to a camera during capturing through the target object in the captured image. There has been an attempt to extract a type, position, and relative pose of a target object by using a learning model using an artificial neural network, but to use such a learning model, 3D model data for training the learning model is required.

To generate the 3D model data, the relative pose of the target object may be extracted by locating the target object around a marker and capturing an image of the marker together with the target object. However, such a method is unable to be used in an environment where it is difficult to use the marker or in an environment where it is difficult to arrange the marker around because the target object is too large. There is a need for a method of recognizing a target object with high accuracy and estimating a pose by generating 3D model data in an environment where a marker cannot be used.

SUMMARY

This section provides a general summary of the inventive concept, and is not a comprehensive disclosure of its full scope or all features of the inventive concept.

Provided are a method and program for generating 3-dimensional (3D) model data while capturing an image of a target object with a camera.

Additional aspects will be set forth in part in the description which follows and, in part, will be apparent from the description, or may be learned by practice of the presented embodiments of the disclosure.

According to an aspect of the present disclosure, there is provided a method, performed by a computing device, of generating 3-dimensional (3D) model data, the method includes: capturing, by a camera, an image of a target object at a first time point and storing first pose data of the camera at this time; generating a second image by capturing, by the camera, the target object at a second time point and generating second pose data of the camera at this time; calculating a distance between the camera at the second time point and the target object, based on the first pose data and second pose data of the camera; generating pose data of the target object, based on the distance and the second pose data of the camera; and estimating second relative pose data of the target object, based on the second pose data of the camera and the pose data of the target object.

According to another aspect of the present disclosure, there is provided a method, performed by a computing device, of generating 3-dimensional (3D) model data, the method including: capturing, by a camera, an image of a target object at a first time point and storing first pose data of the camera at this time; generating a second image by capturing, by the camera, the target object at a second time point and generating second pose data of the camera at this time; calculating a distance between the camera at the second time point and the target object, based on the first pose data and second pose data of the camera; calculating a pitch angle and a roll angle, based on the second pose data of the camera; receiving a yaw angle; generating second relative pose data of the target object, based on the distance, the pitch angle, the roll angle, and the yaw angle; generating pose data of the target object, based on the second pose data of the camera and the second relative pose data of the target object; generating a third image by capturing, by the camera, the target object at a third time point and generating third pose data of the camera at this time; and estimating third relative pose data of the target object, based on the third pose data of the camera and the pose data of the target object.

According to another aspect of the present disclosure, there is provided a computer program stored in a medium to execute the method of generating 3D model data by using a computing device.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5 illustrates an image of a target object captured by a camera at a second time, relative pose information of the target object, and a processed image where a virtual block corresponding to the target object is displayed;

Figure 1:
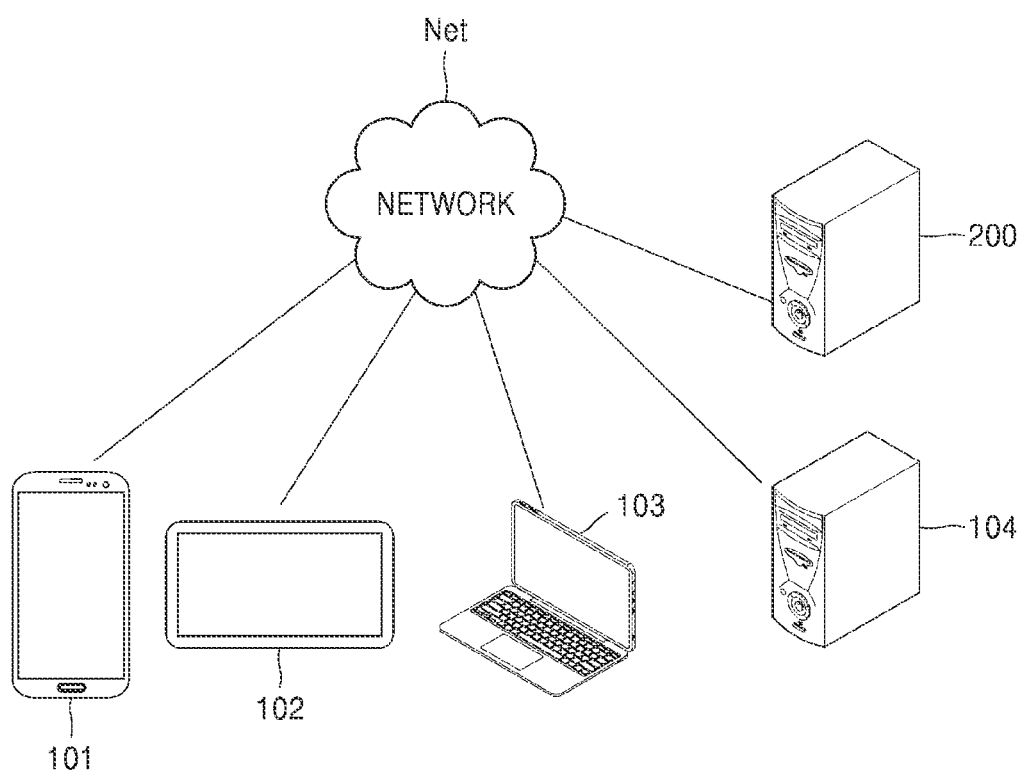
FIG. 1 is a diagram of a network configuration of an apparatus for generating 3-dimensional (3D) model data, according to an embodiment.

It should be noted that these figures are intended to illustrate the general characteristics of methods and/or structures utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by the example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those of ordinary skill in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element, there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flowcharts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, a central processing unit (CPU), a controller, an arithmetic logic unit (ALU), a digital signal processor, a microcomputer, a field programmable gate array (FPGA), a system-on-chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, a CPU, a controller, an ALU, a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording media, including tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such a separate computer readable storage medium may include a universal serial bus (USB) flash drive, a memory stick, a Blu-ray/DVD/CD-ROM drive, a memory card, and/or other similar computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other similar medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one of ordinary skill in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different to that of the methods described, and/or components such as the described system, architecture, devices, circuit, and the like, may be connected or combined to be different from the above-described methods, or results may be appropriately achieved by other components or equivalents.

The detailed description of the present disclosure to be described below refers to the accompanying drawings, which illustrate specific embodiments in which the present disclosure may be practiced. These embodiments are described in sufficient detail to enable one of ordinary skill in the art to practice the present disclosure. It is to be understood that various embodiments of the present disclosure are different from each other, but need not be mutually exclusive. For example, specific shapes, structures, and characteristics described herein may be changed from one embodiment to another embodiment and implemented without departing from the spirit and scope of the present disclosure. In addition, it should be understood that positions or arrangements of individual elements in each embodiment may be changed without departing from the spirit and scope of the present disclosure. Accordingly, the detailed description described below is not implemented in a limiting sense, and the scope of the present disclosure may encompass the scope claimed by claims and all scopes equivalent thereto. In drawings, the like reference numerals denote the same or similar elements over various aspects.

FIG. 1 is a diagram of a network configuration of an apparatus for generating 3-dimensional (3D) model data, according to an embodiment.

Referring to FIG. 1, the apparatus may be a terminal and access a server 200 via a network Net.

The apparatus according to an embodiment may generate 3D model data including an image of a target object and relative pose information of the target object by capturing the image of the target object by using a camera.

The relative pose information is information indicating a pose of the target object with respect to the camera. The pose of the target object on a camera coordinate system may be generated from the relative pose information. The relative pose information may include, for example, relative pose data of the target object or vertex coordinate values of a virtual block on a 2D camera coordinate system generated from the relative pose data.

The 3D model data includes the image and relative pose information of the target object. The 3D model data may be used by a 3D augmented reality display apparatus or system to train a learning model used to estimate a position, type, and pose of the target object. The 3D augmented reality display apparatus or system generates an augmented image in which a 3D image of a virtual object rendered to have a same pose as the target object is augmented on the image of the target object.

The target object is placed in an environment where there is no marker around. The marker is a criterion for determining the pose of the target object. According to the present disclosure, because there is no marker around the target object, the pose of the target object is not determined by an external environment but is determined by a user or the apparatus of the present disclosure.

In the present specification, the target object is an object photographed by the camera and the 3D model data generated according to the present disclosure is about the target object. The pose is a concept including a position and orientation of the object. The pose of the target object may be understood as representing the position and orientation of the target object on a world coordinate system and a relative pose of the target object may be understood as representing the position and orientation of the target object on the camera coordinate system. A pose of the camera may be understood as representing a position and orientation of the camera on the world coordinate system.

The World coordinate system may be an absolute coordinate system such as a geocentric coordinate system. The camera coordinate system is a coordinate system defined by the pose of the camera, wherein the camera is positioned at an origin of the camera coordinate system and x, y, and z axes of the camera coordinate system are defined according to a direction in which the camera is directed.

In the camera coordinate system, the x axis is defined to as a horizontal direction (a right side is +) when a subject is viewed from the camera, the y axis is defined as a vertical direction (an upper side is +), and the z axis is defined as a direction from the subject to the camera. In the present specification, embodiments of the present disclosure will be described according to the x, y, and z axes of the camera coordinate system defined above. However, the x, y, and z axes of the camera coordinate system defined above are only an example and may vary depending on a design of a user.

The 2D camera coordinate system is also a 2D coordinate system defined by the pose of the camera and is a coordinate system in which a 3D space viewed from the position of the camera is projected in 2D. The 2D camera coordinate system may be represented in a 2D image captured by the camera, wherein an x axis is defined as a horizontal direction (a right side is +) of the 2D image and a y axis is defined as a vertical direction (an upper side is +). The x and y axes of the 2D camera coordinate system are only an example and may vary depending on a design of the user.

For easy understanding of the present disclosure, an object coordinate system is used. The object coordinate system is a coordinate system determined by the target object and a direction selected by the user, wherein the target object is positioned in an origin of the object coordinate system and x, y, and z axes of the object coordinate system are defined by a direction defined by the user with respect to the target object.

In the object coordinate system, a +z direction may be defined as a direction facing front from a center of the target object. In other words, a direction facing front of the target object may be defined as a −z direction. A +x direction may be defined as a direction facing left from the center of the target object and a +y direction may be defined as a direction facing top from the center of the target object. In the present specification, embodiments of the present disclosure will be described according to the x, y, and z axes of the object coordinate system defined above. However, the x, y, and z axes of the object coordinate system defined above are only an example and may vary depending on a design of a user.

Figure 2:
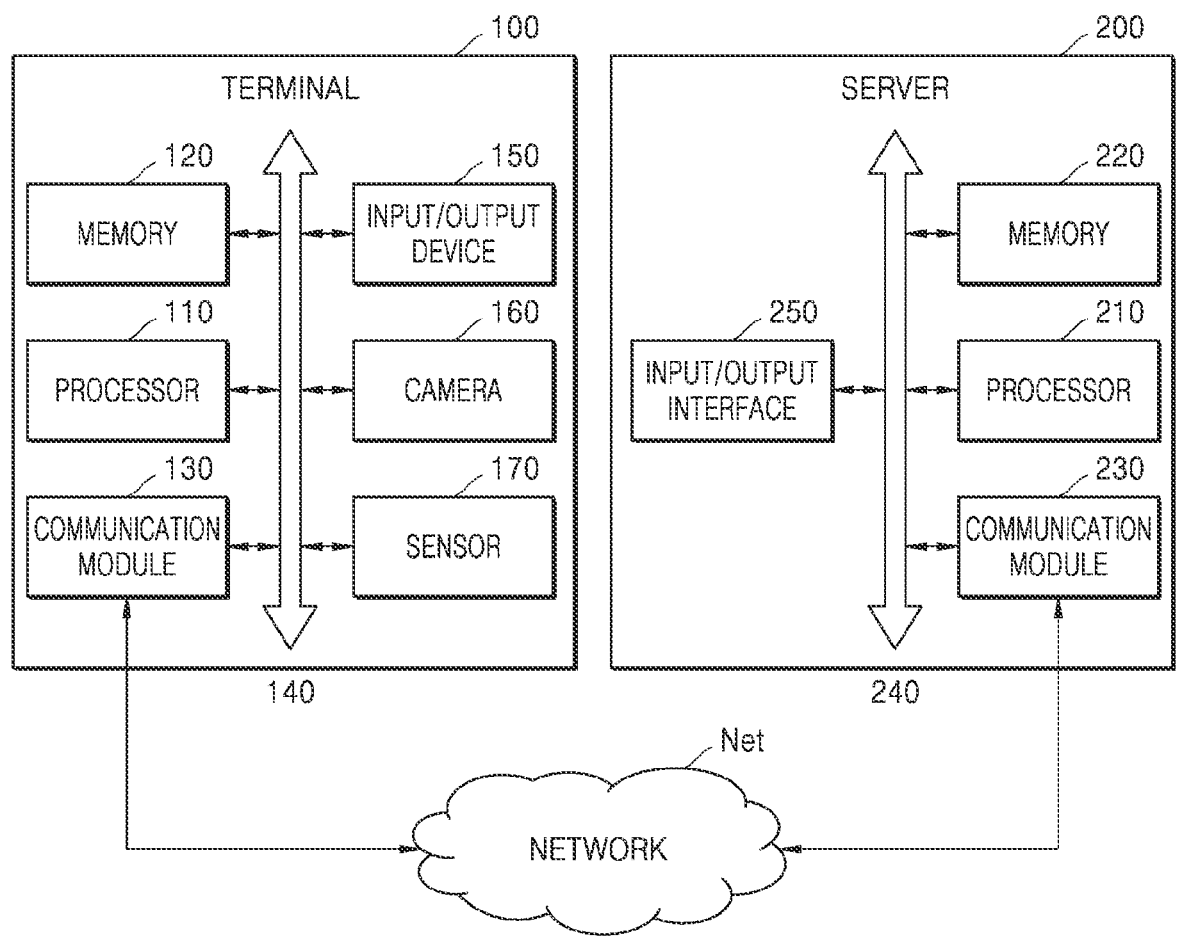
FIG. 2 is a diagram of internal configurations of a terminal and a server, according to an embodiment.

The terminal is a user terminal performing a computing function and may be referred to as a terminal 100 of FIG. 2. The terminal 100 may include, for example, a smart phone 101, a table personal computer (PC) 102, a laptop computer 103, and a PC 104. According to an embodiment, the terminal 100 may include a camera, a wireless communication module, and an input/output device like the smart phone 101, the table PC 102, and the laptop computer 103. According to another embodiment, the terminal 100 may not directly include a camera but may be connected to a camera (not shown) via the network Net, such as the PC 104. The PC 104 may receive an image captured by the camera and information about the camera via the network Net. The camera may include an inertial sensor and the information about the camera may include pose information of the camera. According to another embodiment, the terminal 100 may be the laptop computer 103 or the PC 104 including the camera.

Hereinbelow, it is assumed that the terminal 100 directly includes the camera, such as the smart phone 101. However, according to another embodiment of the present disclosure, the terminal 100 may not directly include the camera and may exchange data with the camera in real time via the network Net.

The terminal 100 may communicate with the server 200 by accessing the network Net via wired communication and/or wireless communication. The terminal 100 may store 3D model data including an image of a target object captured via the camera and relative pose information of the target object or transmit the 3D model data to the server 200. The server 200 may receive the image and relative pose information of the target object from the terminal 100 and train a learning model.

In the present specification, it is described that the terminal 100 transmits the 3D model data generated with respect to the terminal 100 to the server 200, but the terminal 100 may train a learning model implemented in an artificial neural network by using the 3D model data.

The network Net may communicably connect the terminal 100 and the server 200. For example, the network Net provides an access path for the terminal 100 to access the server 200 and transmit the image and relative pose information of the target object. The network Net may provide a path for the terminal 100 to receive, from the camera, image data and pose data of the camera.

The network Net may include a wired network and/or a wireless network. For example, the network Net may include various networks, such as a local area network (LAN), a metropolitan area network (MAN), and a wide area network (WAN). The network Net may include World Wide Web (WWW). However, the network Net according to the current embodiment is not limited thereto, and may include at least one of a known mobile communication network, a known wireless data network, a known phone network, and a known wired/wireless television network.

The network Net may include one or more of network topologies including a bus network, a start network, a ring network, a mesh network, a star-bus network, and a tree or hierarchical network.

The server 200 may be implemented as one or more computing devices providing a command, a code, a file, content, and a service while communicating with the terminal 100 via the network Net. The server 200 may receive the image and relative pose information of the target object from the terminal 100 and train the learning model implemented as an artificial neural network by using the image and relative pose information of the target object. The terminal 100 may generate about tens to hundreds of pieces of 3D model data for one target object and provide the same to the server 200.

An augmented reality terminal (not shown) for displaying 3D augmented reality may access the server 200. When the augmented reality terminal transmits an image obtained by capturing the target object, the server 200 may extract a type, position, and pose of the target object from the received image by using the learning model. The server 200 may provide, to the augmented reality terminal, at least one of relative pose data, position data, and type data of the target object via the network Net.

The augmented reality terminal may render a 3D image of a virtual object having a same pose as the target object, based on the relative pose data of the target object. The augmented reality terminal may include a rendering model for 3D —rendering the virtual object. The rendering model may include a plurality of pieces of base data for rendering a plurality of virtual objects.

FIG. 2 is a diagram of internal configurations of the terminal 100 and the server 200, according to an embodiment.

Referring to FIG. 2, an apparatus for generating 3D model data may access the server 200 via, for example, the network Net. Hereinbelow, the apparatus will be referred to as the terminal 100.

The terminal 100 may include a processor 110, a memory 120, a communication module 130, a bus 140, an input/output device 150, a camera 160, and a sensor 170. According to another embodiment, the terminal 100 may not include the sensor 170.

The processor 110 may perform basic arithmetic, logic, and input/output operations and for example, execute a program code stored in the memory 120.

The memory 120 is a recording medium readable by the processor 110 of the terminal 100, and may include random access memory (RAM), read-only memory (ROM), and a permanent mass storage device such as a disk drive. The memory 120 may store an operating system and at least one program or application code. The memory 120 may store a program code capable of generating the 3D model data according to various embodiments.

The communication module 130 may access the network Net to exchange data with the server 200. For example, the processor 110 of the terminal 100 may transmit 3D model data for a target object to the server 200 through the communication module 130, according to a program code stored in the memory 120.

The bus 140 may provide a path for exchanging data between at least some of the processor 110, memory 120, communication module 130, input/output device 150, camera 160, and sensor 170 of the terminal 100.

The input/output device 150 may receive an input from a user and transmit the same to the processor 110, and output information received from the processor 110 to the user. For example, an input device of the input/output device 150 may include the camera 160. In addition, the input/output device 150 may include, as an input device, a touch screen, a microphone, a button, a keyboard, or a mouse. The input/output device 150 may include, as an output device, an image display device such as a display, or a voice output device such as a speaker or an earphone.

The user may use the input/output device 150 to operate the terminal 100 or camera 160 to capture an image of a target object. The user may input angle information for setting a reference direction of the target object through the input/output device 150. The user may use the input/output device 150 to select an image captured in a pre-set direction (for example, a front direction or a side direction) from among a plurality of images of the target object.

The terminal 100 may include a display device for displaying an image captured by the camera 160.

The camera 160 may generate an image of the target object by photographing the target object. The camera 160 may provide the image of the target object to the processor 110 via the bus 140.

The sensor 170 may include an inertial sensor and may detect information about a direction, speed, acceleration, or the like of the camera 160 or the terminal 100 where the camera 160 is mounted. For example, the sensor 170 may include a 3-axis acceleration sensor or 3-axis gyro sensor. The terminal 100 may use a sensor value of the sensor 170 to detect movement and rotation of the camera 160 or the terminal 100 where the camera 160 is mounted.

The terminal 100 may further include components other than those shown in FIG. 2. For example, the terminal 100 may include a position detection module. The position detection module may be a function block capable of electronically detecting a current position of the terminal 100.

The server 200 may include a processor 210, a memory 220, a communication module 230, a bus 240, and an input/output interface 250.

The processor 210 may perform basic arithmetic, logic, and input/output operations and may execute a program code stored in the memory 220, for example, a learning model.

The memory 220 is a recording medium readable by the processor 210 of the server 200, and may include RAM, ROM, and a permanent mass storage device such as a disk drive. The memory 220 may store an operating system and at least one program or application code. The memory 220 may store a program code implementing a learning model capable of extracting a type, position, and relative pose data of the target object from the image of the target object. Also, the memory 220 may store a program code for training the learning model by using 3D model data received from the terminal 100.

The communication module 230 may access the network Net wirelessly to receive data from the terminal 100 and transmit data to the terminal 100. For example, the communication module 230 may receive the 3D model data of the target object from the terminal 100.

The bus 240 may provide a path for exchanging data between at least some of the processor 210, memory 220, communication module 230, and input/output interface 250. The input/output interface 250 may provide an interface method with the input/output device 150.

Figure 3:
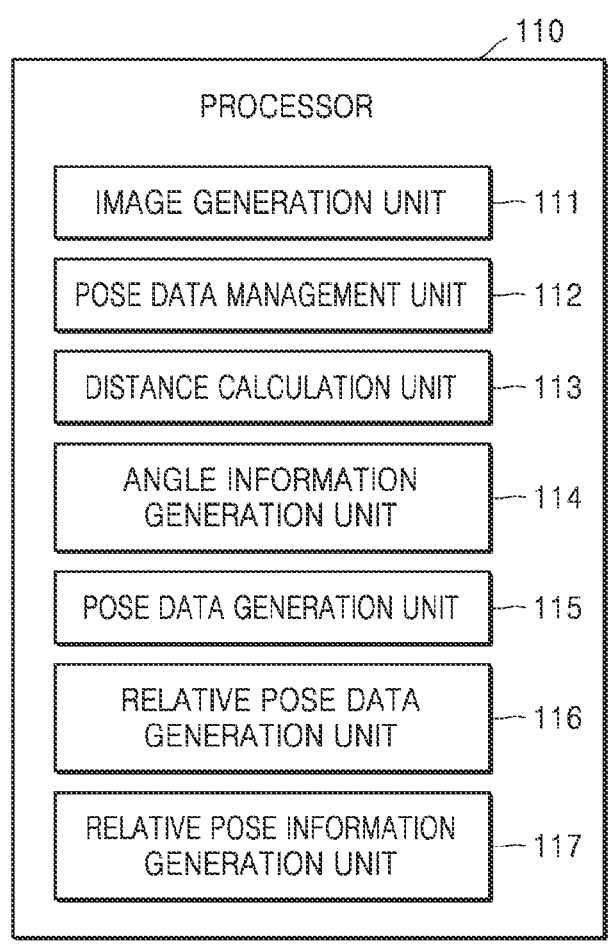
FIG. 3 is a block diagram of an internal configuration of a processor of a terminal, according to an embodiment.

FIG. 3 is a block diagram of an internal configuration of the processor 110 of the terminal 100, according to an embodiment.

Referring to FIG. 3, the processor 110 includes an image generation unit 111, a pose data management unit 112, a distance calculation unit 113, a pose data generation unit 115, and a relative pose data generation unit 116. According to an embodiment, the processor 110 may further include an angle information generation unit 114 and/or a relative pose information generation unit 117.

Figure 6:
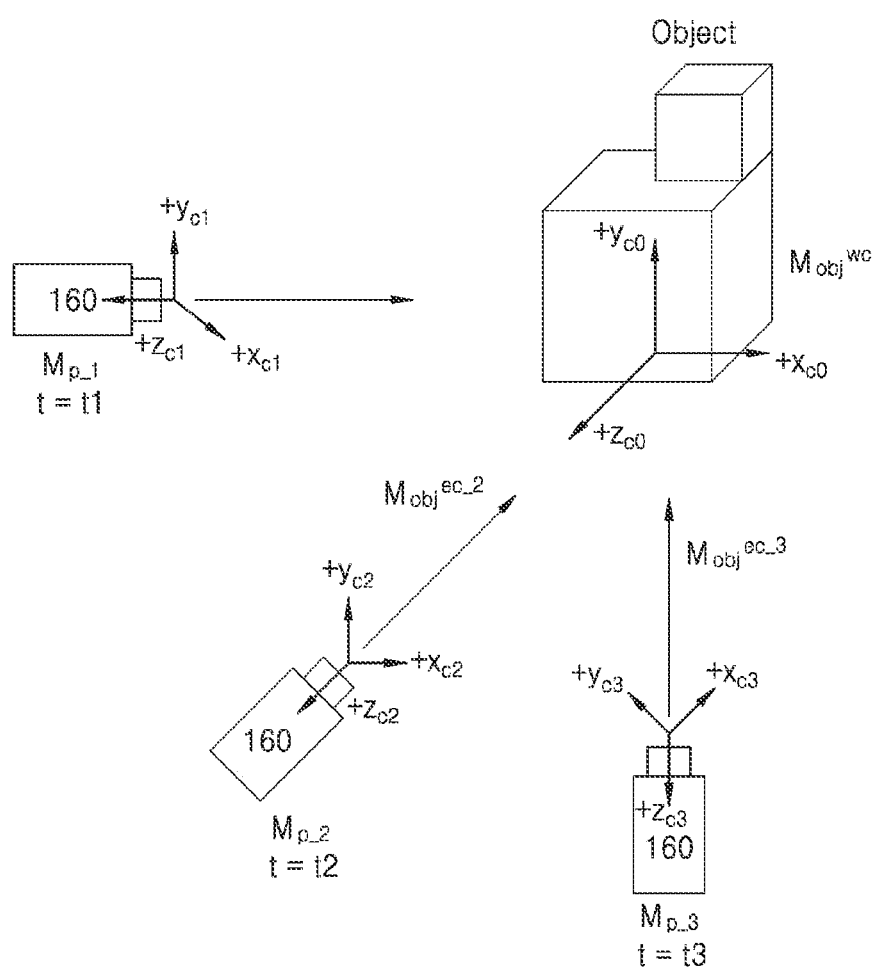
FIG. 6 illustrates photographing a target object by a camera at first through third time points.

The image generation unit 111 may generate an image by capturing a target object Object of FIG. 6 by using the camera 160. The camera 160 may be mounted on the terminal 100. However, this is only an example and the camera 160 may be communicably connected to the terminal 100 to exchange data in real time. Hereinbelow, it is described that the terminal 100 includes the camera 160, but the present disclosure is not limited thereto.

In the present specification, an image obtained by capturing the target object Object at a first time point t1 is referred to as a first image Image1, an image obtained by capturing the target object Object at a second time point t2 is referred to as a second image Image2 of FIG. 5, and an image obtained by capturing the target object Object at a third time point t3 is referred to as a third image Image3. The second time point t2 may be after the first time point t1 and the third time point t3 may be after the second time point t2. However, this is only an example and the second time point t2 may be before the first time point t1.

The camera 160 or the terminal 100 where the camera 160 is mounted may move between the first through third time points t1 through t3. For example, the camera 160 or the terminal 100 including the camera 160 may perform, between the first through third time points t1 through t3, translational motion of a first magnitude in a first direction or a rotational motion of a second magnitude in a second direction.

The pose data management unit 112 may store and mange pose data $M_p$ of the camera 160 at a time point when the camera 160 photographed the target object Object.

The pose data $M_p$ of the camera 160 may be a model matrix indicating a pose of the camera 160 on a world coordinate system. The pose data $M_p$ of the camera 160 may denote a matrix for converting coordinate values on a camera coordinate system defined by the pose of the camera 160 onto the world coordinate system, or element values of the matrix. The camera 160 performing the translational and/or rotational motions denote that the pose of the camera 160 is changed, and thus the pose data $M_p$ of the camera 160 is also changed.

The pose data management unit 112 may store first pose data $M_{p\_1}$ at the first time point t1, store second pose data $M_{p\_2}$ at the second time point t2, and store third pose data $M_{p\_3}$ at the third time point t3. The pose data management unit 112 may delete the pose data $M_p$ stored before a pre-set time to efficiently manage the memory 120 storing pieces of the pose data $M_p$.

View data $M_p^{-1}$ of the camera 160 may have a relationship of an inverse function with the pose data $M_p$ of the camera 160. The view data $M_p^{-1}$ of the camera 160 may be a view matrix indicating how a world, i.e., a fixed subject, moved and rotated on the camera coordinate system. In other words, the view data $M_p^{-1}$ of the camera 160 may denote a matrix for converting coordinate values on the world coordinate system onto the camera coordinate system or element values of the matrix.

The processor 110 may calculate the view data $M_p^{-1}$ of the camera 160 based on the pose data $M_p$ of the camera 160 or calculate the pose data $M_p$ of the camera 160 based on the view data $M_p^{-1}$ of the camera 160. In the present specification, the pose data $M_p$ and the view data $M_p^{-1}$ of the camera 160 may have the above meanings, but according to another embodiment, pose data may be a view matrix and view data may be an inverse matrix, i.e., a model matrix of the pose data.

The pose data management unit 112 may detect motion of the camera 160 and change or newly generate the pose data $M_p$ of the camera 160 according to the motion of the camera 160.

According to an embodiment, the pose data management unit 112 may detect the motion of the camera 160 based on how feature points of images captured by the camera 160 moved. For example, the pose data management unit 112 may detect how feature points in the first image Image1 and feature points in the second image Image2 have changed with each other, and estimate a direction and magnitude of the translational motion of the camera 160 and a direction and magnitude of the rotational motion of the camera 160, based on the detection. According to an embodiment, the pose data management unit 112 may generate and manage the pose data $M_p$ of the camera 160 by using a visual odometry technology.

According to another embodiment, the pose data management unit 112 may generate and manage the pose data $M_p$ of the camera 160 based on sensor values of the sensors 170 in the terminal 100. The sensors 170 may be inertial sensors and may output sensor values corresponding to where and how much the terminal 100 has moved and rotated. In this case, the pose data $M_p$ of the camera 160 may be related to a direction of the Earth's gravity. In other words, the pose data $M_p$ of the camera 160 may indicate to which position and in which direction the camera 160 is directed, based on the direction of the Earth's gravity.

According to another embodiment, the pose data management unit 112 may generate and manage the pose data $M_p$ of the camera 160, based on the changes in the feature points in the images captured by the camera 160 and the sensor values of the sensors 170. For example, the pose data management unit 112 may generate and manage the pose data $M_p$ of the camera 160 by using a visual inertial odometry technology. In this case as well, the pose data $M_p$ of the camera 160 may be related to the direction of the Earth's gravity.

In the present specification, pose data of the camera 160 at the first time point t1 is referred to as the first pose data $M_{p\_1}$, pose data of the camera 160 at the second time point t2 is referred to as the second pose data $M_{p\_2}$, and pose data of the camera 160 at the third time point t3 is referred to as the third pose data $M_{p\_3}$. A position of the camera 160 at the first time point t1 is referred to as a first position, a position of the camera 160 at the second time point t2 is referred to as a second position, and a position of the camera 160 at the third time point t3 is referred to as a third position.

The camera coordinate system defined by a pose of the camera 160 at the first time point t1 is referred to as a first camera coordinate system, the camera coordinate system defined by a pose of the camera 160 at the second time point t2 is referred to as a second camera coordinate system, and the camera coordinate system defined by a pose of the camera 160 at the third time point t3 is referred to as a third camera coordinate system.

Figure 7A:
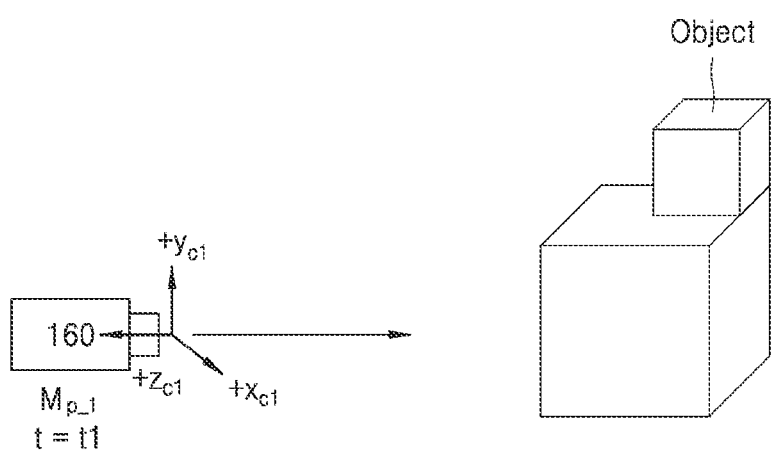
FIGS. 7A through 7F are diagrams for describing an operation of generating relative pose information of a target object, according to an embodiment.
Figure 7B:
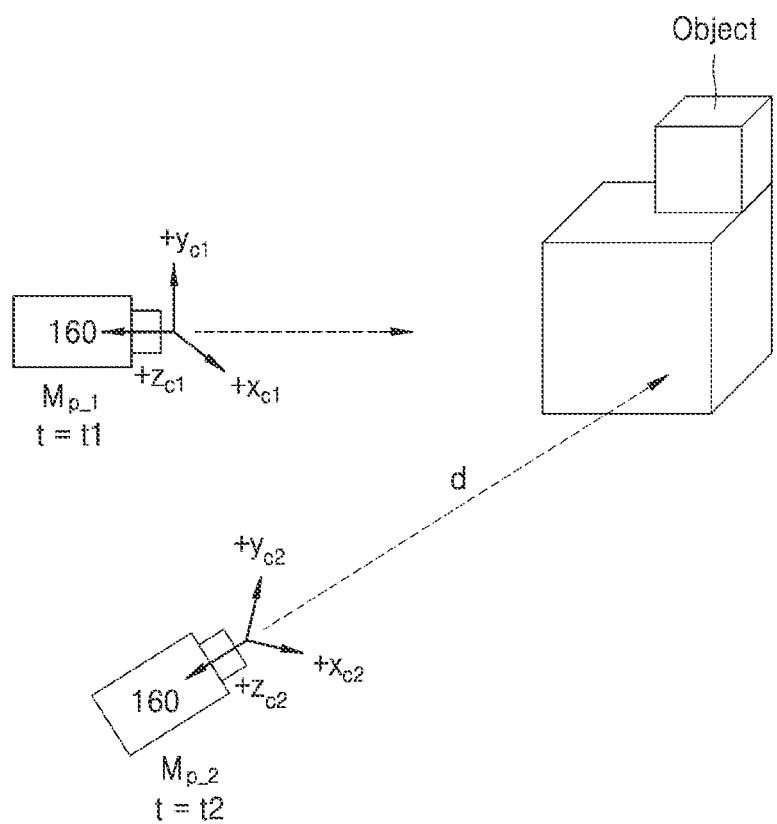

The distance calculation unit 113 calculates a distance d of FIG. 7b between the camera 160 and the target object Object, based on the pose data $M_p$ of the camera 160. According to an embodiment, the distance calculation unit 113 may calculate the distance d between the position of the camera 160 at the second time point t2 and a position of the target object Object, based on the first pose data $M_{p\_1}$ of the camera 160 at the first time point t1 and the second pose data $M_{p\_2}$ of the camera 160 at the second time point t2.

According to an embodiment, the distance calculation unit 113 may calculate the distance d between the camera 160 and the target object Object by using triangulation. However, an embodiment is not limited thereto, and the distance calculation unit 113 may use another algorithm or use a subsidiary peripheral device, such as a laser measurer, to measure the distance d between the camera 160 and the target object Object.

According to an embodiment, the distance calculation unit 113 may extract the first position of the camera 160 at the first time point t1 and the first direction from the camera 160 to the target object Object from the first pose data $M_{p\_1}$ of the camera 160. Also, the distance calculation unit 113 may extract the second position of the camera 160 at the second time point t2 and the second direction from the camera 160 to the target object Object from the second pose data $M_{p\_2}$ of the camera 160.

The distance calculation unit 113 may calculate a displacement between the first position and the second position by using the first pose data $M_{p\_1}$ and the second pose data $M_{p\_2}$. By assuming a triangle consisting of the first position-the second position-the target object Object, the distance calculation unit 113 may obtain a first angle between the second position-the first position-the target object Object and a second angle between the first position-the second position-the target object Object, by using the first pose data $M_{p\_1}$ and the second pose data $M_{p\_2}$. The distance calculation unit 113 may identify one side of the triangle and angles of both ends of the side, and calculate the distance d from the position of the camera 160 at the second time point t2, i.e., from the second position to the target object Object, by using a triangulation method.

The angle information generation unit 114 may generate angle information for determining a position of the camera 160 with respect to the target object Object, for example, the second position of the camera 160 at the second time point t2. The angle information may be used to determine a pre-set direction of the target object Object, for example, a front direction. The angle information may be used to determine each axis of an object coordinate system. An origin of the object coordinate system is determined by the position of the target object Object and each axis of the object coordinate system may be determined by the angle information generated by the angle information generation unit 114.

The angle information may include, for example, a pitch angle, a roll angle, and a yaw angle. The object coordinate system may be determined by rotating the second camera coordinate system defined by the pose of the camera 160 at the second time point t2 according to the angle information. For example, the object coordinate system may be determined by rotating the second camera coordinate system in the pitch angle, the roll angle, and the yaw angle.

According to an embodiment, the pitch angle, the roll angle, and the yaw angle may be input by a user. The angle information generation unit 114 may generate the angle information by receiving the pitch angle, roll angle, and yaw angle input by the user.

According to another embodiment, the pitch angle and roll angle may be extracted from the second pose data $M_{p\_2}$ of the camera 160 at the second time point t2 and the yaw angle may be input by the user. Here, the second pose data $M_{p\_2}$ is related to the direction of the Earth's gravity. The angle information generation unit 114 may generate the angle information by calculating the pitch angle and roll angle for matching a −y axis direction of the second camera coordinate system to the direction of the Earth's gravity, based on the second pose data $M_{p\_2}$, and receiving the yaw angle input by the user. The yaw angle may be an angle for matching a z axis direction with the front direction of the target object Object.

According to another embodiment, the user may photograph the target object Object while positioning the camera 160 in a pre-set direction with respect to the target object Object at the second time point t2. According to an embodiment, the pre-set direction may be the front direction of the target object Object. In other words, the camera 160 may capture an image of the front of the target object Object. In this case, the pitch angle, roll angle, and yaw angle may all be determined as 0. The angle information generation unit 114 may generate the angle information in which the pitch angle, roll angle, and yaw angle are all 0.

According to another embodiment, the angle information generation unit 114 may determine the pitch angle, roll angle, and yaw angle according to a pre-set direction. For example, when the pre-set direction is a side direction of the target object Object, the pitch angle and roll angle are 0 and the yaw angle may be determined as +90° or −90° according to the pre-set direction. The angle information generation unit 114 may display a plurality of directions selectable by the user and the user may select one of the plurality of directions to determine the pre-set direction. For example, the angle information generation unit 114 may present, to the user, the plurality of directions, such as front, right, left, right 45°, left 45°, and upper 45°, and the user may select one of the plurality of directions and photograph the target object Object in the selected direction to generate the second image Image2, and the angle information may be generated according to the selected direction.

According to another embodiment, the second image Image2 may be determined as the user selects an image captured in a pre-set direction from among images of the target object Object captured by the camera 160, and a time point when the second image Image2 is captured may be determined as the second time point t2.

The pose data generation unit 115 may generate pose data $M_{obj}^{wc}$ of the target object Object based on the distance d and the second pose data $M_{p\_2}$ of the camera 160. The pose data generation unit 115 may generate the pose data $M_{obj}^{wc}$ of the target object Object, based on the second pose data $M_{p\_2}$ of the camera 160 generated by the pose data management unit 112, the distance d calculated by the distance calculation unit 113, and the angle information generated by the angle information generation unit 114.

The pose data $M_{obj}^{wc}$ of the target object Object may be a matrix for converting coordinate values on the object coordinate system onto the world coordinate system or element values of the matrix. The object coordinate system is a coordinate system defined by the target object Object, wherein the target object Object may be located in the origin of the object coordinate system and x, y, and z axes of the object coordinate system may be determined based on a direction appointed by the user with respect to the target object Object.

According to an embodiment, the pose data generation unit 115 may calculate the pose data $M_{obj}^{wc}$ of the target object Object by moving the second pose data $M_{p\_2}$ of the camera 160 in a −z axis direction by the distance d. The −z axis direction is a −z axis direction of the second camera coordinate system and may be a direction from the camera 160 to the target object Object.

According to another embodiment, the pose data generation unit 115 may calculate the pose data $M_{obj}^{wc}$ of the target object Object by moving the second pose data $M_{p\_2}$ of the camera 160 in the −z axis direction by the distance d and rotating the same in an angle according to the angle information. According to another embodiment, the pose data generation unit 115 may calculate the pose data $M_{obj}^{wc}$ of the target object Object by moving the second pose data $M_{p\_2}$ of the camera 160 in the −z axis direction by the distance d, rotating the same in the pitch angle and the roll angle according to the angle information. The pose data generation unit 115 may calculate the pose data $M_{obj}^{wc}$ of the target object Object by moving the second pose data $M_{p\_2}$ of the camera 160 in the −z axis direction by the distance d to generate a first pose matrix, generating a second pose matrix by rotating the first pose matrix in the pitch angle and roll angle, and rotating the second pose matrix in the yaw angle.

The relative pose data generation unit 116 may generate relative pose data $M_{obj}^{ec}$ of the target object Object based on the pose data $M_p$ of the camera 160 and the pose data $M_{obj}^{wc}$ of the target object Object. The relative pose data $M_{obj}^{ec}$ of the target object Object may be a matrix converting coordinate values on the object coordinate system onto the camera coordinate system defined by the pose of the camera 160 or element values of the matrix.

According to an embodiment, the relative pose data generation unit 116 may generate second relative pose data $M_{obj}^{ec\_2}$ of the target object Object, based on the second pose data $M_{p\_2}$ of the camera 160 and the pose data $M_{obj}^{wc}$ of the target object Object. The second relative pose data $M_{obj}^{ec\_2}$ of the target object Object may be a matrix converting the coordinate values on the object coordinate system onto the second camera coordinate system defined by the pose of the camera 160 at the second time point t2, or element values of the matrix.

The relative pose data generation unit 116 may calculate the second relative pose data $M_{obj}^{ec\_2}$ of the target object Object by multiplying the pose data $M_{obj}^{wc}$ of the target object Object by an inverse matrix $M_{p\_2}^{-1}$ of the second pose data $M_{p\_2}$ of the camera 160.

The pose data $M_{obj}^{wc}$ of the target object Object, the relative pose data $M_{obj}^{ec}$ of the target object Object, and the pose data $M_p$ and view data $M_p^{-1}$ of the camera 160 may be in a form of a 4×4 pose matrix. The 4×4 pose matrix may include a 3×3 rotation matrix and a 3×1 translation matrix. For example, the 4×4 pose matrix may be defined as [(3×3 translation matrix), (3×1 translation matrix); (0 0 0), 1].

The relative pose information generation unit 117 may generate relative pose information $P^{2dec}$ based on the relative pose data $M_{obj}^{ec}$ of the target object Object. The relative pose information $P^{2dec}$ may be stored in the memory 120 or transmitted to the server 200 together with the image of the target object Object captured by the camera 160, as training data.

According to an embodiment, the relative pose information generation unit 117 may generate second relative pose information $P^{2dec\_2}$ of the target object Object based on the second relative pose data $M_{obj}^{ec\_2}$ of the target object Object. To generate the second relative pose information $P^{2dec\_2}$ of the target object Object, the terminal 100 may receive, from the user, size information of a virtual block vb of FIG. 7F corresponding to the target object Object. The virtual block vb may be a rectangular parallelepiped, and the size information may be width, length, and height information.

The relative pose information generation unit 117 may generate virtual block coordinates $P_{vb}^{obj}$ on the object coordinate system, based on the size information of the virtual block vb. For example, when the width of 2a, the length of 2b, and the height of c are input as the size information of the virtual block vb, the virtual block coordinates $P_{vb}^{obj}$ on the object coordinate system may include (a, b, 0), (a, −b, 0), (−a, −b, 0), (−a, b, 0), (a, b, c), (a, −b, c), (−a, −b, c), and (−a, b, c) according to coordinates of each vertex of the virtual block vb.

The relative pose information generation unit 117 may generate virtual block coordinates $P_{vb}^{ec\_2}$ on the second camera coordinate system, based on the virtual block coordinates $P_{vb}^{obj}$ on the object coordinate system and the second relative pose data $M_{obj}^{ec\_2}$ of the target object Object. The virtual block coordinates $P_{vb}^{ec\_2}$ on the second camera coordinate system may be calculated by multiplying the second relative pose data $M_{obj}^{ec\_2}$ of the target object Object by the virtual block coordinates $P_{vb}^{obj}$ on the object coordinate system.

The relative pose information generation unit 117 may generate virtual block coordinates $P_{vb}^{2dec\_2}$ on a second 2D camera coordinate system, based on the virtual block coordinates $P_{vb}^{ec\_2}$ on the second camera coordinate system. The second camera coordinate system is a 3D coordinate system defined by the pose of the camera 160 at the second time point t2 and the second 2D camera coordinate system is a 2D coordinate system defined by the pose of the camera 160 at the second time point t2. The relative pose information generation unit 117 may convert the virtual block coordinates $P_{vb}^{ec\_2}$ on the second camera coordinate system to the virtual block coordinates $P_{vb}^{2dec\_2}$ on the second 2D camera coordinate system, by using a matrix for converting coordinates on a 3D coordinate system to coordinates on a 2D coordinate system.

The relative pose information generation unit 117 may generate the virtual block coordinates $P_{vb}^{2dec\_2}$ on the second 2D camera coordinate system as the second relative pose information $P^{2dec\_2}$. An example of the virtual block coordinates $P_{vb}^{2dec\_2}$ on the second 2D camera coordinate system is shown in FIG. 5.

The second relative pose data $M_{obj}^{ec\_2}$ of the target object Object denotes a position and direction relationship between target object Object and the camera 160 at the second time point t2, but the second relative pose information $P^{2dec\_2}$ of the target object Object, i.e., the virtual block coordinates $P_{vb}^{2dec\_2}$ on the second 2D camera coordinate system, may denote not only the position and direction relationship between the target object Object and the camera 160 at the second time point t2, but also a position in the second image Image2 where the target object Object is displayed. Accordingly, a region in the second image Image2 where the target object Object is displayed may be accurately extracted.

Figure 4:
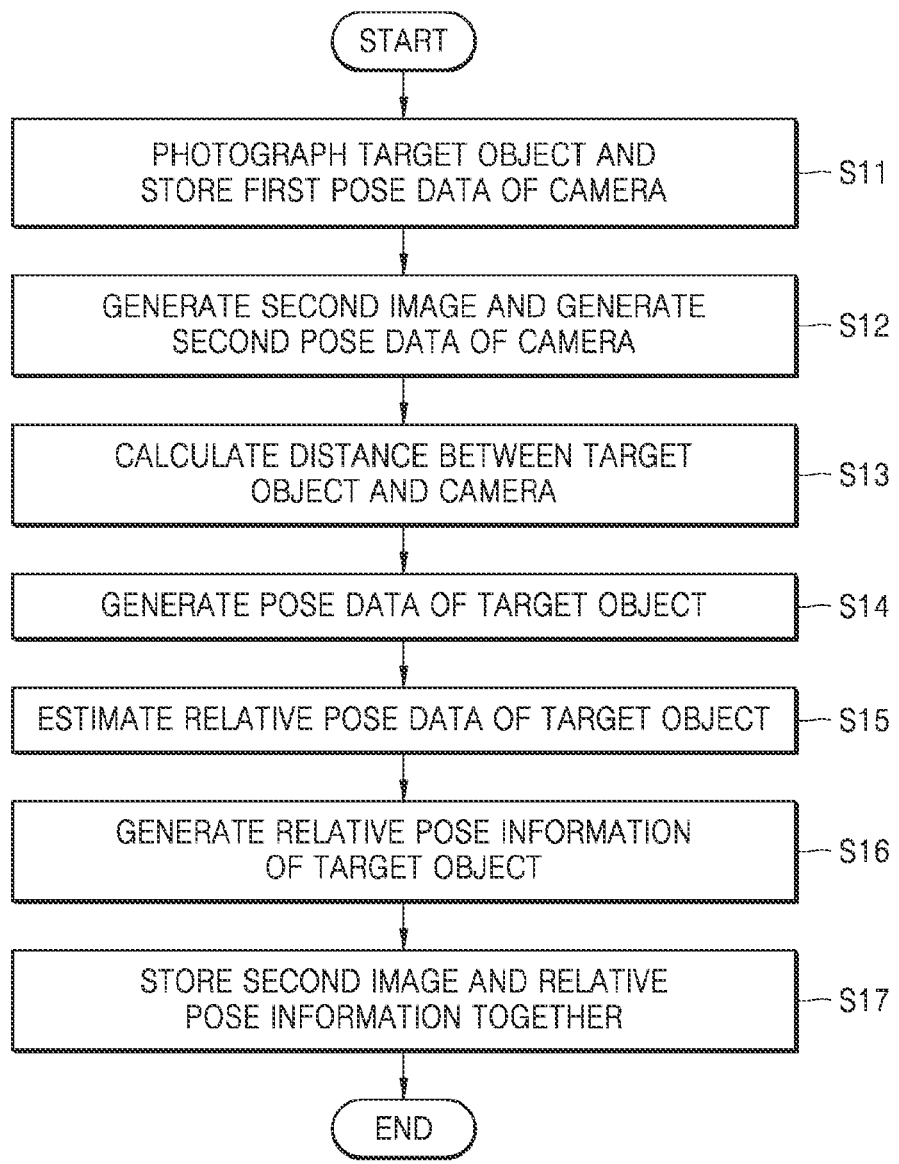
FIG. 4 is a flowchart of a method of generating 3D model data, according to an embodiment.

FIG. 4 is a flowchart of a method of generating 3D model data, according to an embodiment. FIGS. 5 through 7 are diagrams for describing the method of generating 3D model data, according to an embodiment. FIG. 5 illustrates the second image Image2 obtained by photographing the target object Object at the second time point t2 by the camera 160, the second relative pose information $P^{2dec\_2}$ of the target object Object, and a processed image Image2' where the virtual block vb corresponding to the target object Object is displayed. FIG. 6 illustrates photographing the target object Object by the camera 160 at the first through third time points t1 through t3. FIGS. 7A through 7F are diagrams for describing an operation of generating the second relative pose information $P^{2dec\_2}$ of the target object Object, according to an embodiment.

The method of generating 3D model data, according to an embodiment, will be described with reference to FIGS. 4 through 7F.

The processor 110 may generate a first image (not shown) by photographing the target object Object of FIG. 6 with the camera 160 of FIG. 2 at the first time point t1 as shown in FIG. 7A, and store the first pose data $M_{p\_1}$ of the camera at this time, in operation S11. The first image may be generated by the image generating unit 111 and the first pose data $M_{p\_1}$ may be generated by the pose data managing unit 112.

The first pose data $M_{p\_1}$ of the camera 160 may be a first model matrix $M_{ec\_1}{}^{wc}$ for converting coordinate values on a first camera coordinate system onto the world coordinate system. The first camera coordinate system is a 3D coordinate system defined by the pose of the camera 160 at the first time point t1 and having $x_{c1}$, $y_{c1}$, and $z_{c1}$ axes.

In FIG. 6, solely for easy understanding, the target object Object is shown as a structure in which two cubes having different sizes are combined. However, the target object Object may be any object, such as shoes, glasses, electronic products, clothes, or hats sold in stores.

The first pose data $M_{p\_1}$ may be generated first by the pose data managing unit 112. The pose data managing unit 112 may generate the first pose data $M_{p\_1}$ based on the first image or at least one of sensor values of the sensors 170. When the first pose data $M_{p\_1}$ is generated by using the sensor values of the sensors 170, the first pose data $M_{p\_1}$ may be related to the direction of the Earth's gravity. According to another embodiment, when the first pose data $M_{p\_1}$ is generated irrelevantly to the sensor values of the sensors 170, the first pose data $M_{p\_1}$ may have an initial value (for example, 0) irrelevantly to the direction of the Earth's gravity.

The first pose data $M_{p\_1}$ may be indicated by the first model matrix $M_{ec\_1}{}^{wc}$, and the first model matrix $M_{ec\_1}{}^{wc}$ may be represented by a matrix for converting coordinate values on the first camera coordinate system defined by the pose of the camera 160 at the first time point t1 onto the world coordinate system or element values of the matrix.

The processor 110 may generate the second image Image2 of FIG. 5 by photographing the target object Object with the camera 160 at the second time point t2 as shown in FIG. 7B, and store the second pose data $M_{p\_2}$ of the camera 160 at this time, in operation S12. The second image Image2 may be generated by the image generating unit 111 and the second pose data $M_{p\_2}$ may be generated by the pose data managing unit 112.

The second pose data $M_{p\_2}$ of the camera 160 may be a matrix $M_{ec\_2}{}^{wc}$ for converting the second camera coordinate system defined by the pose of the camera 160 at the second time point t2 onto the world coordinate system. The second camera coordinate system is a 3D coordinate system defined by the pose of the camera 160 at the second time point t2 and having $x_{c2}$, $y_{c2}$, and $z_{c2}$ axes.

The pose data managing unit 112 may estimate the direction and magnitude of the translational motion and the direction and magnitude of the rotational motion, in response to the motion of the camera 160 between the first time point t1 and the second time point t2. According to an embodiment, the pose data managing unit 112 may estimate the direction and magnitude of the translational motion and the direction and magnitude of the rotational motion between the first time point t1 and the second time point t2, based on a change between feature points of the first image and feature points of the second image Image2. According to another embodiment, the pose data managing unit 112 may estimate the direction and magnitude of the translational motion and the direction and magnitude of the rotational motion between the first time point t1 and the second time point t2, based on the change between feature points of the first image and feature points of the second image Image2, and the sensor value of the sensor 170.

The pose data managing unit 112 may generate the second pose data $M_{p\_2}$ of the camera 160, based on the first pose data $M_{p\_1}$ of the camera 160, the direction and magnitude of the translational motion, and the direction and magnitude of the rotational motion.

The processor 110 may calculate the distance d between the target object Object and the camera 160 at the second time point t2, based on the first pose data $M_{p\_1}$ of the camera 160 and the second pose data $M_{p\_2}$ of the camera 160, in operation S13.

The distance d between the target object Object and the camera 160 at the second time point t2 may be calculated by the distance calculating unit 113. According to an embodiment, the distance calculation unit 113 may calculate the distance d of FIG. 7B between the camera 160 and the target object Object by using triangulation.

Also, the distance calculation unit 113 may extract the first position of the camera 160 at the first time point t2 and the first direction from the camera 160 to the target object Object from the first pose data $M_{p\_1}$ of the camera 160. The distance calculation unit 113 may extract the second position of the camera 160 at the second time point t2 and the second direction from the camera 160 to the target object Object from the second pose data $M_{p\_2}$ of the camera 160. The distance calculation unit 113 may calculate a displacement between the first position and the second position by using the first pose data $M_{p\_1}$ and the second pose data $M_{p\_2}$.

By assuming a triangle consisting of the first position-the second position-the target object Object, the distance calculation unit 113 may calculate the first angle between the second position-the first position-the target object Object and the second angle between the first position-the second position-the target object Object, by using the first pose data $M_{p\_1}$ and the second pose data $M_{p\_2}$. Because the distance calculating unit 113 is able to calculate one side of the triangle (displacement between the first position and the second position) and both end angles (the first angle and the second angle) thereof, the distance d between the target object Object and the camera 160 at the second time point t2 may be calculated by using the triangulation.

The processor 110 may generate pose data $M_{obj}{}^{wc}$ of the target object Object based on the distance d and the second pose data $M_{p\_2}$ of the camera 160, in operation S14. According to an embodiment, the pose data $M_{obj}{}^{wc}$ of the target object Object may be generated by the pose data generating unit 115.

The pose data $M_{obj}{}^{wc}$ of the target object Object may be a matrix for converting coordinate values on the object coordinate system defined based on the target object Object onto the world coordinate system. The origin of the object coordinate system may be defined by the position of the target object Object and each axis of the object coordinate system may be determined by a direction pre-defined with respect to the target object Object.

According to an embodiment, when the camera 160 photographed the front of the target object Object at the second time point t2, the pose data generating unit 115 may calculate the pose data $M_{obj}{}^{wc}$ of the target object Object by moving the second pose data $M_{p\_2}$ of the camera 160 by the distance d in a −z axis direction.

According to another embodiment, when the camera 160 photographed the target object Object in a pre-set direction at the second time point t2, the pose data generating unit 115 may calculate the pose data $M_{obj}^{wc}$ of the target object Object by moving the second pose data $M_{p\_2}$ of the camera 160 by the distance d in a −z axis direction and then rotating the same in an angle corresponding to the pre-set direction.

According to another embodiment, angle information may be used by the pose data generating unit 115 to generate the pose data $M_{obj}^{wc}$ of the target object Object. The angle information may be obtained by the angle information generating unit 114. The angle information may include a pitch angle, a roll angle, and a yaw angle. In this case, the pose data generation unit 115 may calculate the pose data $M_{obj}^{wc}$ of the target object Object by moving the second pose data $M_{p\_2}$ of the camera 160 in the −z axis direction by the distance d and rotating the same in the pitch angle, the roll angle, and the yaw angle included in the angle information. According to an embodiment, the pitch angle, the roll angle, and the yaw angle may be received from a user.

Figure 7C:
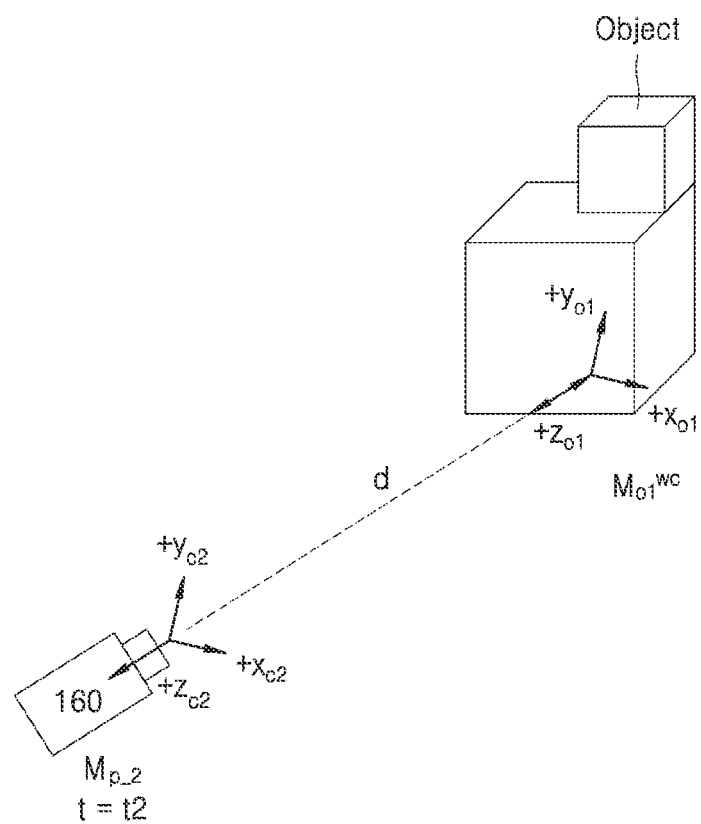

According to an embodiment, the pose data generation unit 115 may generate a first pose matrix $M_{o1}^{wc}$ of FIG. 7C by moving the second pose data $M_{p\_2}$ of the camera 160 in the −z axis direction by the distance d. The first pose matrix $M_{o1}^{wc}$ may be obtained by representing a first object coordinate system on the world coordinate system, wherein the first object coordinate system is a 3D coordinate system having $x_{o1}$, $y_{o1}$, and $z_{o1}$ axes as shown in FIG. 7C.

Figure 7D:
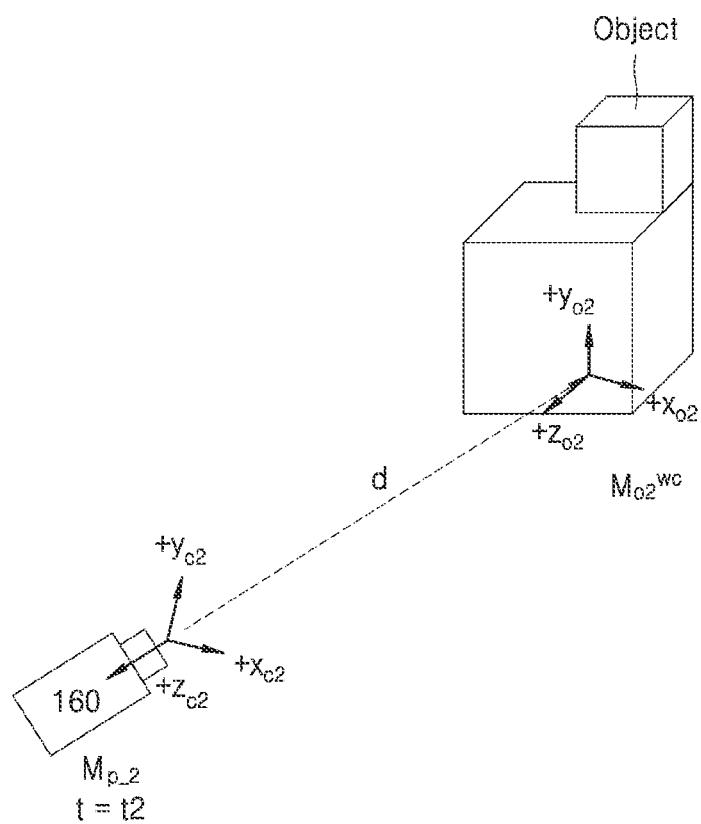

The pose data generating unit 115 may generate a second pose matrix $M_{o2}^{wc}$ of FIG. 7D by rotating the first pose matrix $M_{o1}^{wc}$ by the pitch angle and the roll angle. The second pose matrix $M_{o2}^{wc}$ may be obtained by representing a second object coordinate system on the world coordinate system, wherein the second object coordinate system is a 3D coordinate system having $x_{o2}$, $y_{o2}$, and $z_{o2}$ axes as shown in FIG. 7D. The first pose matrix $M_{o1}^{wc}$ may be rotated in the pitch angle and the roll angle such that the $y_{o2}$ axis of the second object coordinate system faces an opposite direction of the direction of the Earth's gravity.

Figure 7E:
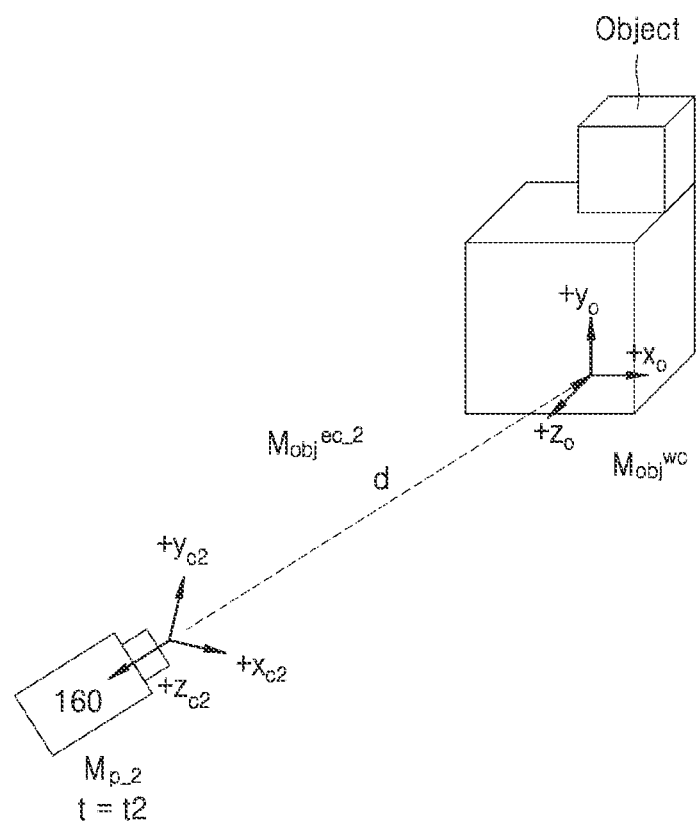
Figure 7F:
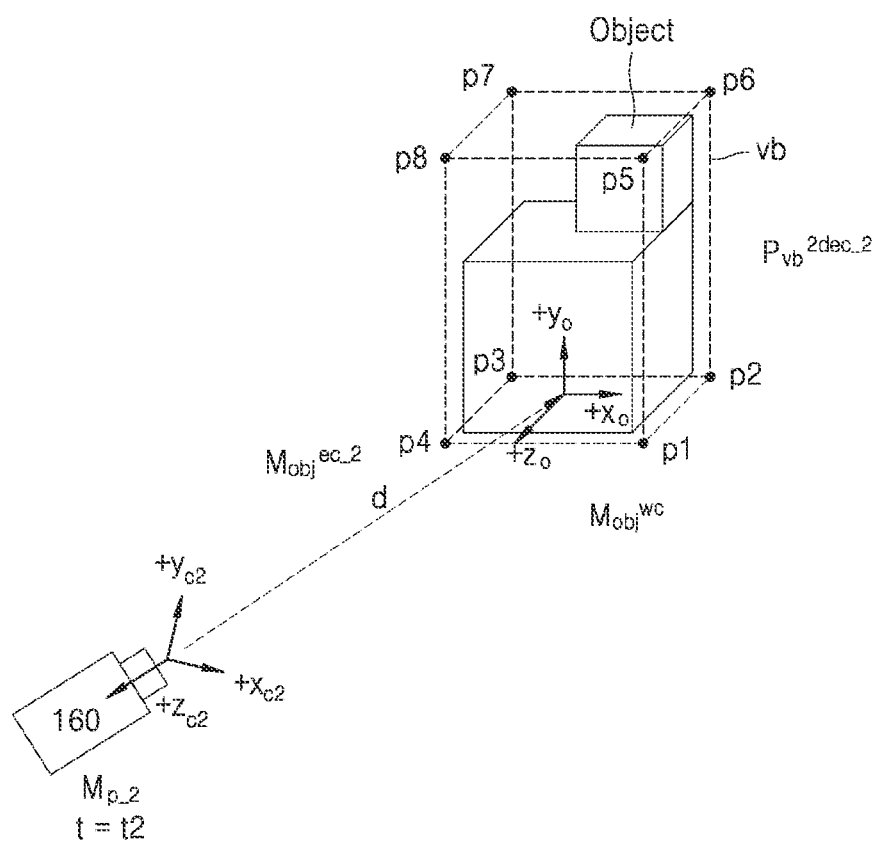

The pose data generating unit 115 may generate the pose data $M_{obj}^{wc}$ of FIG. 7E of the target object Object by rotating the second pose matrix $M_{o2}^{wc}$ in the yaw angle. The pose data $M_{obj}^{wc}$ may be obtained by representing the object coordinate system on the world coordinate system, wherein the object coordinate system is a 3D coordinate system having $x_o$, $y_o$, and $z_o$ axes as shown in FIG. 7E. The second pose matrix $M_{o2}^{wc}$ may be rotated in the yaw angle such that the $z_o$ axis of the object coordinate system faces a front direction of the target object Object.

According to another embodiment, the second pose data $M_{p\_2}$ of the camera 160 may be related to the direction of the Earth's gravity. In this case, the angle information generating unit 114 may extract the pitch angle and roll angle from the second pose data $M_{p\_2}$ of the camera 160. The pitch angle and roll angle may be angles for rotating a −y axis direction of the second pose data $M_{p\_2}$ of the camera 160 in the x and z axes to match the direction of the Earth's gravity. The angle information generating unit 114 may receive the yaw angle from the user. The yaw angle may be an angle for rotating a z axis direction of the pose data $M_{obj}^{wc}$ of the target object Object in the y axis to match the front direction of the target object Object.

The processor 110 may estimate the second relative pose data $M_{obj}^{ec\_2}$ of FIG. 7E of the target object Object based on the second pose data $M_{p\_2}$ of the camera 160 and the pose data $M_{obj}^{wc}$ of the target object Object, in operation S15. The second relative pose data $M_{obj}^{ec\_2}$ of the target object Object may be generated by the relative pose data generating unit 116.

The second relative pose data $M_{obj}^{ec\_2}$ of the target object Object may be a matrix for converting coordinate values on the object coordinate system onto the second camera coordinate system. The relative pose data generation unit 116 may calculate the second relative pose data $M_{obj}^{ec\_2}$ of the target object Object by multiplying the pose data $M_{obj}^{wc}$ of the target object Object by the inverse matrix $M_{p\_2}^{-1}$ of the second pose data $M_{p\_2}$ of the camera 160.

The processor 110 may generate the second relative pose information $P^{2dec\_2}$ of the target object Object, based on the second relative pose data $M_{obj}^{ec\_2}$ of the target object Object, in operation S16. The second relative pose information $P^{2dec\_2}$ of the target object Object may be generated by the relative pose information generating unit 117. In this regard, the relative pose information generating unit 117 may receive the size information of the virtual block vb of FIG. 7F corresponding to the target object Object.

The relative pose information generation unit 117 may generate the virtual block coordinates $P_{vb}^{obj}$ on the object coordinate system, based on the size information of the virtual block vb. The virtual block coordinates $P_{vb}^{obj}$ may be coordinates of vertexes p1 through p8 on the virtual block vb on the object coordinate system. The relative pose information generation unit 117 may generate the virtual block coordinates $P_{vb}^{ec\_2}$ on the second camera coordinate system, based on the virtual block coordinates $P_{vb}^{obj}$ on the object coordinate system and the second relative pose data $M_{obj}^{ec\_2}$ of the target object Object. The relative pose information generation unit 117 may generate, as the second relative pose information $P^{2dec\_2}$, the virtual block coordinates $P_{vb}^{2dec\_2}$ of FIG. 7F on the second 2D camera coordinate system, based on the virtual block coordinates $P_{vb}^{ec\_2}$ on the second camera coordinate system.

The processor 110 may store the second image Image2 and the second relative pose information $P^{2dec\_2}$ of the target object Object as training data for training a learning model, in operation S17. According to another embodiment, the processor 110 may transmit the second image Image2 and the second relative pose information $P^{2dec\_2}$ of the target object Object to the server 200.

The second image Image2 and the second relative pose information $P^{2dec\_2}$ of the target object Object are shown in FIG. 5. The target object Object is shown in the second image Image2 and the virtual block vb corresponding to the target object Object is shown in the processed image Image2'. The second relative pose information $p^{2dec\_2}$ of the target object Object may include the coordinate values of the vertexes p1 through p8 of the virtual block vb on the 2D camera coordinate system. Referring to the processed image Image2', the coordinate values of the vertexes p1 through p8 of the virtual block vb may be shown in the second image Image2. The 2D camera coordinate system may directly correspond to the second image Image2.

According to another embodiment, the processor 110 may generate a third image (not shown) by photographing the target object Object with the camera 160 at the third time point t3 of FIG. 6 and generate the third pose data $M_{p\_3}$ of the camera 160 at this time. The processor 110 may estimate third relative pose data $M_{obj}^{ec\_3}$ of the target object Object based on the third pose data $M_{p\_3}$ of the camera 160 and the pose data $M_{obj}^{wc}$ of the target object Object. The processor 110 may generate third relative pose information $P^{2dec\_3}$ of the target object Object, based on the third relative pose data $M_{obj}^{ec\_3}$ of the target object Object, and store the third image captured at the third time point t3 and the third relative pose information $P^{2dec\_3}$ of the target object Object as training data or transmit the same to the server 200.

According to another embodiment of the present disclosure, the processor 110 may photograph the target object Object with the camera 160 at the first time point t1 and store the first pose data $M_{p\_1}$ of the camera 160 at this time. Also, the processor 110 may generate the second image Image2 by photographing the target object Object with the camera 160 at the second time point t2 and generate the second pose data $M_{p\_2}$ of the camera 160 at this time. The processor 110 may calculate the distance d between the target object Object and the camera 160 at the second time point t2, based on the first pose data $M_{p\_1}$ and the second pose data $M_{p\_2}$.

When the first pose data $M_{p\_1}$ and the second pose data $M_{p\_2}$ are related to the direction of the Earth's gravity, the processor 110 may calculate the pitch angle and roll angle based on the second pose data $M_{p\_2}$ of the camera 160 and receive the yaw angle from the user. The processor 110 may generate the second relative pose data $M_{obj}^{ec\_2}$ of the target object Object, based on the distance d, pitch angle, roll angle, and yaw angle. The second relative pose data $M_{obj}^{ec\_2}$ of the target object Object may be a matrix that moves by the distance d and rotates in the pitch angle, roll angle, and yaw angle.

The processor 110 may generate the second relative pose information $P^{2dec\_2}$ based on the second relative pose data $M_{obj}^{ec\_2}$ of the target object Object, and store the second image Image2 and the second relative pose information $P^{2dec\_2}$ in the memory 120 as training data or transmit the same to the server 200.

The processor 110 may generate the pose data $M_{obj}^{wc}$ of the target object Object based on the second pose data $M_{p\_2}$ of the camera 160 and the second relative pose data $M_{obj}^{ec\_2}$ of the target object Object.

The processor 110 may generate the third image Image3 by photographing the target object Object with the camera 160 at the third time point t3 and generate the third pose data $M_{p\_3}$ of the camera 160 at this time. The processor 110 may estimate the third relative pose data $M_{obj}^{ec\_3}$ of the target object Object based on the third pose data $M_{p\_3}$ of the camera 160 and the pose data $M_{obj}^{wc}$ of the target object Object.

The processor 110 may generate the third relative pose information $P^{2dec\_3}$ based on the third relative pose data $M_{obj}^{ec\_3}$ of the target object Object, and store the third image Image3 and the third relative pose information $P^{2dec\_3}$ in the memory 120 as training data or transmit the same to the server 200.

According to various embodiments of the present disclosure, the terminal 100 is able to generate relative pose information of the target object Object even when the target object Object is photographed without a marker defining an object coordinate system, and thus training data, i.e., 3D model data, for training a learning model for extracting, from an image of the target object Object, a type, position, and relative pose data of the target object Object may be generated in a massive amount. For example, when the terminal 100 captures a moving image of the target object Object with the camera 160 while moving around the target object Object, the relative pose information of the target object Object may be generated for every frame image of the moving image. Because the learning model is trained based on every frame image of the moving image and the relative pose information corresponding thereto, the accuracy of the learning model may be increased.

According to various embodiments of the present disclosure, the 3D model data may be generated by extracting a captured image and the relative pose information of the target object Object with respect to the camera 160 while photographing the target object Object with the camera 160 without a marker. The 3D model data may later be used to train the learning model for extracting, from the captured image of the target object Object, the type, position, and relative pose of the target object Object.

The various embodiments described above are exemplary and are not necessarily distinguished and independently implemented. The embodiments described in the present specification may be implemented in combination with each other.

The various embodiments described above may be implemented in a form of a computer program executable by various components on a computer, and such a computer program may be recorded in a computer-readable medium. Here, the medium may continuously store computer-executable programs, or temporarily store the computer-executable programs or instructions for execution or downloading. Also, the medium may be any one of various recording media or storage media in which a single piece or plurality of pieces of hardware are combined, and the medium is not limited to a medium directly connected to a computer system, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

In the specification, the term "unit" or "module" may be a hardware component such as a processor or circuit and/or a software component that is executed by a hardware component such as a processor. For example, the "unit" or "module" may be implemented by software components, object-oriented software components, class components, and task components, and may include processes, functions, attributes, procedures, subroutines, segments of program code, drivers, firmware, micro codes, circuits, data, a database, data structures, tables, arrays, or variables.

The above description of the present disclosure is provided for illustration, and it will be understood by one of ordinary skill in the art that various changes in form and details may be readily made therein without departing from essential features and the scope of the present disclosure as defined by the following claims. Accordingly, the embodiments described above are examples in all aspects and are not limited. For example, each component described as a single type may be implemented in a distributed manner, and similarly, components described as distributed may be implemented in a combined form.

The scope of the present disclosure is defined by the appended claims rather than the detailed description, and all changes or modifications within the scope of the appended claims and their equivalents will be construed as being included in the scope of the present disclosure.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be modified in various ways. Such modifications are not to be regarded as a departure from the disclosure, and all such modifications are intended to be included within the scope of the disclosure.

What is claimed is:

1. A method, performed by a computing device, of generating 3-dimensional (3D) model data, the method comprising:
   capturing, by a camera, an image of a target object at a first time point and storing first pose data of the camera;
   generating a second image by capturing, by the camera, the target object at a second time point and generating second pose data of the camera;
   calculating a distance between the camera at the second time point and the target object, based on the first pose data and second pose data of the camera;
   generating pose data of the target object, based on the distance and the second pose data of the camera; and
   estimating second relative pose data of the target object, based on the second pose data of the camera and the pose data of the target object.

2. The method of claim 1, wherein the pose data of the target object is calculated by moving the second pose data of the camera by the distance in a −z axis direction.

3. The method of claim 1, wherein the pose data of the target object is calculated by moving the second pose data of the camera by the distance in a −z axis direction and rotating the second pose data at a pre-set angle.

4. The method of claim 1, wherein the generating of the pose data of the target object comprises:
   obtaining a pitch angle, a roll angle, and a yaw angle; and
   calculating the pose data of the target object by moving the second pose data of the camera by the distance in a −z axis direction and rotating the second pose data in the pitch angle, the roll angle, and the yaw angle.

5. The method of claim 4, wherein the second pose data of the camera is related to a direction of the Earth's gravity, and
   the obtaining of the pitch angle, the roll angle, and the yaw angle comprises:
      calculating the pitch angle and the roll angle for matching a −y axis direction of the second pose data of the camera with the direction of the Earth's gravity, based on the second pose data of the camera; and
      receiving the yaw angle for matching a z axis direction of the pose data of the target object with a front direction of the target object.

6. The method of claim 4, wherein the calculating of the pose data of the target object comprises:
   generating a first pose matrix by moving the second pose data of the camera by the distance in the −x axis direction;
   generating a second pose matrix by rotating the first pose matrix in the pitch angle and the roll angle; and
   calculating the pose data of the target object by rotating the second pose matrix in the yaw angle.

7. The method of claim 1, further comprising:
   generating second relative pose information, based on the second relative pose data of the target object; and
   storing the second image and the second relative pose information as training data or transmitting the second image and the second relative pose information to a server communicating with the computing device.

8. The method of claim 7, further comprising receiving size information of a virtual block corresponding to the target object,
   wherein the generating of the second relative pose information comprises:
      generating virtual block coordinates on an object coordinate system, based on the size information of the virtual block;
      generating virtual block coordinates on a second camera coordinate system, based on the virtual block coordinates on the object coordinate system and the second relative pose data of the target object; and
      generating, as the second relative pose information, virtual block coordinates on a second 2D camera coordinate system, based on the virtual block coordinates on the second camera coordinate system,
   wherein the second camera coordinate system and the second 2D camera coordinate system are defined based on the pose of the camera at the second time point.

9. The method of claim 1, wherein the generating of the second pose data of the camera comprises:
   estimating a direction and magnitude of a translational motion and a direction and magnitude of a rotational motion, in response to motion of the camera between the first time point and the second time point; and
   generating the second pose data of the camera, based on the first pose data of the camera, the direction and magnitude of the translational motion, and the direction and magnitude of the rotational motion.

10. The method of claim 9, wherein the direction and magnitude of the translational motion and the direction and magnitude of the rotational motion are estimated based on a change between feature points of a first image generated by capturing, by the camera, the target object at the first time point and feature points of the second image.

11. The method of claim 9, wherein the direction and magnitude of the translational motion and the direction and magnitude of the rotational motion are estimated based on a change between feature points of a first image generated by capturing, by the camera, the target object at the first time point and feature points of the second image, and a sensor value of an inertial sensor.

12. The method of claim 1, wherein the pose data of the target object is a matrix for converting a coordinate value on an object coordinate system defined based on the target object onto a world coordinate system,
   wherein an origin of the object coordinate system is determined by a position of the target object and each axis of the object coordinate system is determined by a direction pre-defined with respect to the target object.

13. The method of claim 12, wherein the first pose data of the camera is a matrix for converting a coordinate value on a first camera coordinate system defined by a pose of the camera at the first time point onto the world coordinate system, and
   the second pose data of the camera is a matrix for converting a coordinate value on a second camera coordinate system defined by a pose of the camera at the second time point onto the world coordinate system.

14. The method of claim 13, wherein the second relative pose data of the target object is a matrix for converting the coordinate value on the object coordinate system onto the second camera coordinate system.

15. The method of claim 13, wherein the second relative pose data of the target object is calculated by multiplying the pose data of the target object by an inverse matrix of the second pose data of the camera.

16. The method of claim 1, further comprising:
   generating a third image by capturing, by the camera, the target object at a third time point and generating third pose data of the camera; and estimating third relative pose data of the target object, based on the third pose data of the camera and the pose data of the target object.

17. The method of claim 1, wherein the first pose data of the camera, the second relative pose data of the target object, and the pose data of the target object are each in a form of a 4×4 pose matrix including a 3×3 rotation matrix and a 3×1 translation matrix.

18. A method, performed by a computing device, of generating 3-dimensional (3D) model data, the method comprising:
    capturing, by a camera, an image of a target object at a first time point and storing first pose data of the camera;
    generating a second image by capturing, by the camera, the target object at a second time point and generating second pose data of the camera;
    calculating a distance between the camera at the second time point and the target object, based on the first pose data and second pose data of the camera;
    calculating a pitch angle and a roll angle, based on the second pose data of the camera;
    receiving a yaw angle;
    generating second relative pose data of the target object, based on the distance, the pitch angle, the roll angle, and the yaw angle;
    generating pose data of the target object, based on the second pose data of the camera and the second relative pose data of the target object;
    generating a third image by capturing, by the camera, the target object at a third time point and generating third pose data of the camera; and
    estimating third relative pose data of the target object, based on the third pose data of the camera and the pose data of the target object.

19. The method of claim 18, further comprising:

generating second relative pose information, based on the second relative pose data of the target object;

storing the second image and the second relative pose information as training data or transmitting the second image and the second relative pose information to a server communicating with the computing device;

generating third relative pose information, based on the third relative pose data of the target object; and storing the third image and the third relative pose information as training data or transmitting the third image and the third relative pose information to the server.

* * * * *